No. 878,114. PATENTED FEB. 4, 1908.
J. BROUWERS.
CURD MILL.
APPLICATION FILED SEPT. 17, 1907.

WITNESSES:
Vernon J. Lilly.
Palmer A. Jones.

INVENTOR
John Brouwers
BY
Luther V. Moulton
ATTORNEY

UNITED STATES PATENT OFFICE.

JOHN BROUWERS, OF ZEELAND, MICHIGAN.

CURD-MILL.

No. 878,114.  Specification of Letters Patent.  Patented Feb. 4, 1908.

Application filed September 17, 1907. Serial No. 393,330.

*To all whom it may concern:*

Be it known that I, JOHN BROUWERS, a citizen of the United States of America, residing at Zeeland, in the county of Ottawa and State of Michigan, have invented certain new and useful Improvements in Curd-Mills; and I do hereby declare the following to be a full, clear, and exact description of the invention, such as will enable others skilled in the art to which it appertains to make and use the same.

My invention relates to improvements in curd mills, and its object is to provide an improved device for slicing or pulverizing curd in the process of manufacturing cheese; heretofore this operation has been usually performed by manually pressing a knife or blade through the curd at frequent intervals and then cutting it into slices.

Figure 1:
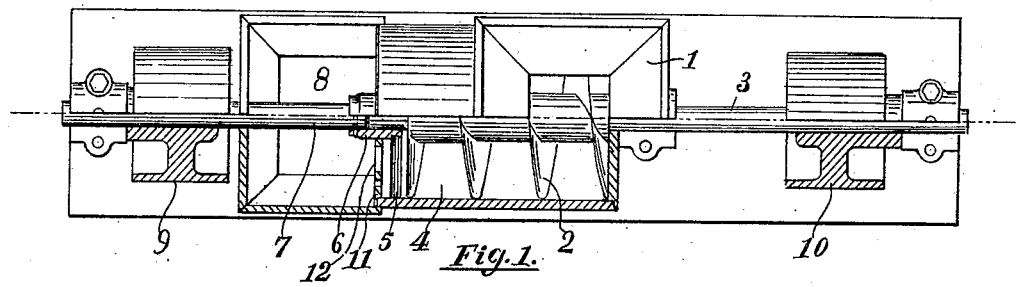
Figure 2:
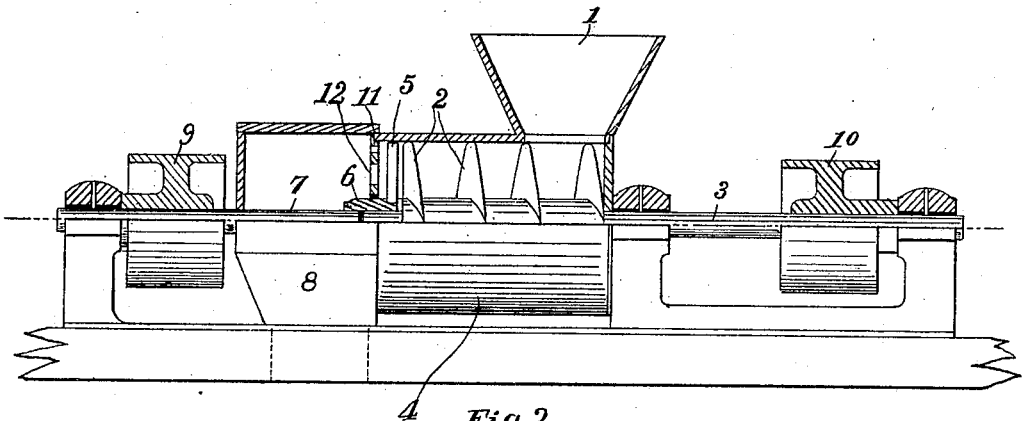
Figure 3:
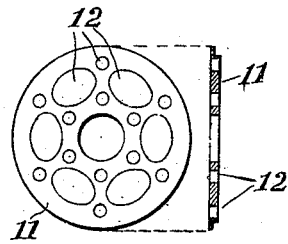
Figure 4:
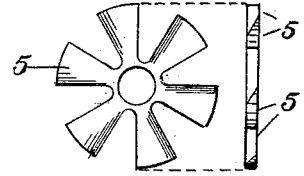

My invention consists essentially of a screw conveyer inclosed in a cylindrical case and having a slow rotary movement, the end of the case being provided with a series of openings through which the curd escapes, and a cutting wheel having radial blades and interposed between the conveyer and the said perforated end and also having a more rapid rotary motion than the conveyer, as will more fully appear by reference to the accompanying drawings, in which:

Figure 1 is a plan view of a device embodying my invention with portions shown in horizontal section; Fig. 2 an elevation of the same with portions shown in vertical section; Fig. 3 a detail of the perforated end of the cylinder; and Fig. 4 a detail of the rotary cutter.

Like numbers refer to like parts in all of the figures.

1 represents a hopper to receive the curd and discharge the same downward into one end of a cylindrical case 4 in the axis of which is a shaft 3 on which is mounted a spiral conveyer 2 which forces the curd toward the head 11 at one end of the case 4. This head 11 is provided with perforations 12 through which the curd escapes after being thoroughly shredded or sliced by means of a rotary cutter 5 having radial blades and mounted on the end of a sleeve 6 fixed on the end of a shaft 7 and rotated thereby, said sleeve also supporting the end of the shaft 3. The shaft 7 is provided with a pulley 9 and the shaft 3 with a pulley 10, each of which is connected with any suitable driving pulley, the shaft 7 being connected to a pulley considerably larger than the shaft 3, whereby the shaft 7 has a more rapid movement than the shaft 3. The material after passing through the openings 12 in the head 11 falls into a hopper 8 and escapes downward therethrough.

In operation the screw conveyer forces the curd toward the perforated head 11, which latter presents sufficient resistance to the flow of the curd while allowing the same to escape through the openings therein so that the curd is compressed and formed in a solid mass between the conveyer and head through which mass the radial blades of the cutter are rotated and thus slice the curd into thin layers before it passes through the openings in the plate, whereby the curd is suitably pulverized or shredded.

What I claim is:

1. In a curd mill, the combination of a cylindrical case, a hopper near one end of the case, a screw conveyer in the case, a perforated head in the end of the case opposite the hopper, a rotary cutter having radial blades located between the conveyer and the perforated head, and means for independently rotating the cutter and the conveyer.

2. In a curd mill, the combination of a cylindrical case, a hopper above one end of the case, a perforated head in the other end of the case, a sleeve in the axis of the perforated head and forming a journal bearing for the conveyer shaft, a rotary cutter attached to the sleeve and having radial blades located between the end of the conveyer and the perforated head, a shaft fixed in the outer end of the sleeve to drive the cutter, and means for independently driving the conveyer.

In testimony whereof I affix my signature in presence of two witnesses.

JOHN BROUWERS.

Witnesses:
  PALMER A. JONES,
  LUTHER V. MOULTON.